P. KILLPATRICK.
CLEANING MACHINE.
APPLICATION FILED JUNE 28, 1913.
1,123,890.
Patented Jan. 5, 1915.
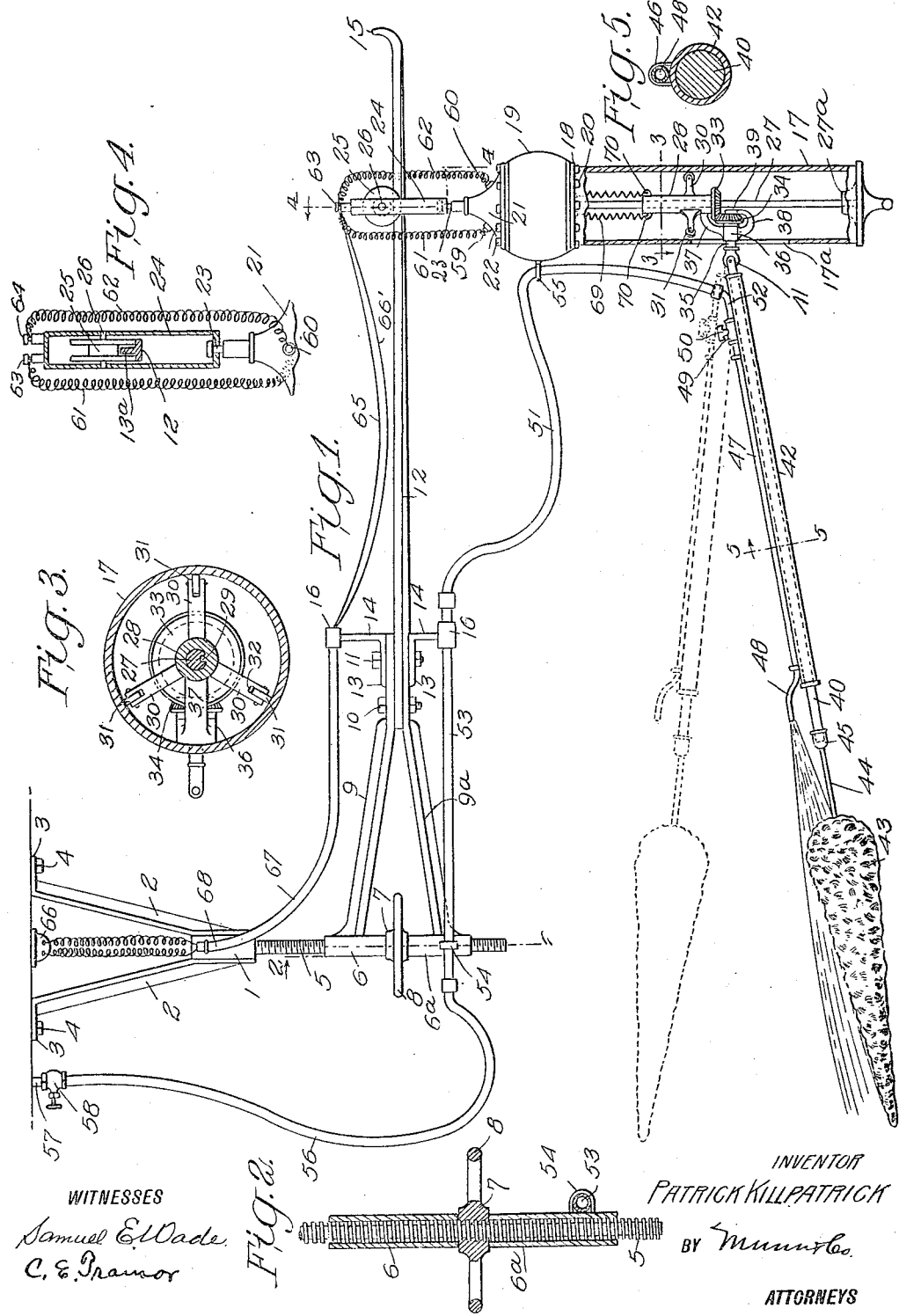
WITNESSES
Samuel E. Wade
C. E. Pramor
INVENTOR
PATRICK KILLPATRICK
BY Munn & Co.
ATTORNEYS

UNITED STATES PATENT OFFICE.

PATRICK KILLPATRICK, OF CHICAGO, ILLINOIS.

CLEANING-MACHINE.

1,123,890.  Specification of Letters Patent. Patented Jan. 5, 1915.

Application filed June 28, 1913. Serial No. 776,371.

*To all whom it may concern:*

Be it known that I, PATRICK KILLPATRICK, a citizen of the United States, and a resident of Chicago, in the county of Cook and State of Illinois, have invented a new and useful Improvement in Cleaning-Machines, of which the following is a specification.

My invention is an improvement in cleaning machines, and has for its object to provide a machine of the character specified, especially adapted for cleaning automobiles and like vehicles, wherein mechanism is provided for supporting a cleaning medium in such manner that the said medium may be applied to any part of the vehicle without the necessity of crawling beneath the same, and wherein a constant stream of water may be applied upon the cleaning medium during the operation of cleaning.

In the drawings:—Figure 1 is a side view of the improved cleaning machine, with parts in section, and Figs. 2, 3, 4 and 5 are sections on the lines 2—2, 3—3, 4—4, and 5—5, respectively, of Fig. 1.

The present embodiment of the invention comprises a bracket of substantially U-shape and consisting of a body 1, and arms 2 connected with the body and diverging from the said body toward their outer ends, each arm having a lateral lug 3 at the end remote from the bearing for engaging a fixed support as for instance, the wall or ceiling of a garage, and each of the said lugs is perforated to receive a bolt or screw 4, for connecting the said bracket to the said fixed support.

A sectional sleeve is arranged on the stem 5, the said sleeve consisting of sections 6 and 6$^a$, which are spaced apart from each other at their inner ends to receive a nut 7, the said nut engaging the stem and having a hand wheel 8 connected therewith for convenience in manipulating the same. By means of the nut the sectional sleeve may be adjusted toward and from the body 1. The sections 6 and 6$^a$ of the sleeve are provided with lateral arms 9 and 9$^a$ respectively, the said arms converging toward the end remote from the sleeve. Each arm is of approximately T-shape in cross section for a portion of its length and beyond the T-shaped portion the arms are arranged alongside each other, and are secured together by bolts and nuts 10 and 11.

A track bar 12 is integral with the arm 9$^a$. The said track bar is provided with a central longitudinally extending up-standing rib 12$^a$ for a purpose to be presently described, and angle brackets 13—14 are secured to the upper and lower sides of the track bar by means of the bolt and nut 11, before mentioned. The outer end of the track bar is curved upwardly as shown, to form a stop 15 for a purpose to be presently described, and the portion 14 of each of the angle plates is provided with a bearing 16 at its free end. Each of the angle plates 13—14 is arranged with the portion 13 lapped upon the outer face of the adjacent arm 9 or 9$^a$, and with the portion 14 of the angle plate perpendicular to the track bar.

A motor supporting carriage in the form of a substantially cylindrical casing 17 is supported by the track bar, the said casing having a marginal flange 18 at its upper end, and a motor casing 19 is connected to the said flange 18, by means of bolts 20. A frusto-conical cap 21 is connected with the upper end of the motor casing by means of bolts 22, and at its upper end the said cap is provided with a headed journal pin 23. A substantially rectangular frame 24 is connected with the pin, the lower cross member of the said frame having an opening through which the pin extends, the head of the pin engaging above the cross member to pivotally connect the motor casing, and the casing 17 to the said frame. A grooved pulley 25 is journaled in the frame on a journal pin 26, and the pulley runs upon the track bar 12, before mentioned, the rib 12$^a$ moving in the groove of the pulley. It will be noted from an inspection of Fig. 4 that the groove of the pulley is of considerable depth and the rib 12$^a$ is of considerable height, so that there can be no disengagement of the pulley. A shaft 27 is journaled at the axis of the casing 17, and the said shaft is the motor shaft extended, or is connected to the motor shaft in any desired manner, the lower end of the said shaft being journaled in a stepped bearing 27$^a$ on the bottom of the casing 17. The motor, not shown, is an electric motor, and a sleeve 28 is mounted for vertical sliding movement on the shaft. A bevel gear 33 shown in Fig. 3, is constrained to rotate with the shaft by means of a feather 29, on the bevel gear which engages a longitudinal groove in the shaft. The sleeve is provided with three radial arms 30, arranged at angular distances of 120° with respect to each other, and a wheel 31 is journaled in a longitudinally extending notch or recess 32 in the outer end of each arm. The arms 30 are of such length that the wheels 31 engage the inner surface of the casing 17 to guide the sleeve in its movement. The bevel gear wheel 33 is rotatably connected to the lower end of the sleeve, and the said gear meshes with a similar gear 34 on a stub shaft 35, which is journaled in a bearing 36 in an arm 37, rigid with the sleeve, and extending outwardly and downwardly therefrom. The said arm is provided with an extension 38, which extends from the bearing 36 in the opposite direction to the arm 37, thence passes beneath the bevel gear 34 and upwardly to the level of the stub shaft, the free end of the arm being provided with a bearing 39, in which the inner end of the stub shaft is journaled. The stub shaft 35 extends through a slot 17$^a$, extending longitudinally of the casing, and a shaft 40 is connected at one end to the stub shaft 35, by means of a universal joint 41, and a tubular holding frame in the form of a sleeve 42 is arranged on the said shaft and extends approximately the full length thereof. A conical sponge 43 or a similar shaped cleaning medium is used in connection with the shaft 40, the said sponge having a stem 44, provided with a socket 45, for engaging the outer end of the shaft 40. The socket is so arranged that the sponge must turn with the shaft 40, and the said shaft is rotated by the motor through the bevel gears 33 and 34. The sleeve 42 is provided with a bearing loop or ring 46, near each of its ends, and a pipe 47 is held in the said loops or rings. The end of the pipe adjacent to the sponge is offset radially from the sleeve to form a discharge nozzle 48 which discharges against the base of the sponge and beyond the said base on to the upper surface of the sponge as shown in Fig. 1. A valve casing 49 is connected with the inner end of the pipe, the said casing having a valve 50 for controlling the flow through the pipe. A flexible pipe 51 has one of its ends connected with an extension 52 from the valve casing, and the opposite end of the said flexible pipe is connected to one end of a pipe 53, supported in the bearing 16 of the lowermost angle plate 13—14, and in a bearing, ring or loop 54 on the section 6$^a$ of the sleeve 6—6$^a$.

The motor casing 19 is provided with a bearing ring or loop 55, for supporting the flexible pipe 51, intermediate its ends, and a flexible pipe 56 connects the end of the pipe 53 adjacent to the threaded stem with a supply pipe 57. A valve casing 58 is connected with the supply pipe between the same and the flexible pipe 56, the said casing having a valve for controlling the supply to the flexible pipe.

The cap 21 is provided with binding posts 59 and 60, and the said posts are connected with the motor. Lead wires 61 and 62 are connected with the binding posts 59 and 60 at one end, and at the other end the said lead wires are connected with binding posts 63 and 64 on the upper cross member of the frame 24. Lead wires 65 and 66 are connected at one end with the binding posts 63 and 64 respectively, and at the other end the said wires pass through openings in a support 66, which is secured to the fixed support between the connection of the arms 2 of the bracket 1—2 therewith. The said lead wires pass downwardly from the support 66 and into a tubular casing 67, supported at one end by the bearing 16 of the upper angle plate 13—14 and at the other end by a bearing ring 68 on the body 1 of the bracket 1—2. Coil springs 69 are connected at one end with the top of the casing 17, and at the other end with eyes 70 on the upper end of the sleeve 28. The said springs act normally to draw the sleeve and connected mechanism upwardly.

In practice, interchangeable sponges 43 will be used, each having a stem provided with a socket, as shown, for engaging the outer end of the shaft 40. The said cleaning members 43 may be of different shapes, and they may be of any suitable material.

In operation, the shaft 40 being provided with a cleaning member 43, the valves 58 and 50 are opened, to permit the water to be discharged on to the said cleaning member. The operator grasps the sleeve 42, and it is obvious that he may direct the cleaning member to any part of the vehicle. The motor casing and the casing 17 may rotate on the frame 24, and the entire mechanism supported by the said frame may be moved toward and from the threaded stem. The stop 15 prevents displacement of the wheel 25 from the track rail. The arm 28 may be raised or lowered on the shaft 27, to bring the mechanism to the proper height and the shaft 40 may be swung up or down with respect to the stub shaft. The track rail and the mechanism supported thereby may be raised and lowered by means of the nut 7 and the flexible pipes 51 and 56 permit all of the adjustments without cutting off the flow of water. It will be noted that the lead wires 61—62 as well as a portion of the wires 65 and 66' adjacent to the support 66 are coiled to permit the angular movement of the motor casing 19 and the vertical movement of the sleeve 6—6$^a$. The sponge or cleaning member 43 rotates continuously at a high rate of speed, thus imparting a rich gloss to the varnish of the vehicle, and a gloss that could not be obtained by hand pressure. The continued flow of water on the cleaning member insures that sand and the like will be removed therefrom, as soon as the said sand or dirt gets on to the cleaning member, thus preventing scraping of the varnish by such sand or dirt.

It will be evident that many changes might be made in the construction without departing from the spirit of the invention.

The device in its simplest form consists of a support capable of attachment to a wall or ceiling, a bracket adjustable toward and from the support and provided with a laterally extending track rail, together with operating mechanism mounted to run on a track rail and having the radially extending shaft mounted to swing in every direction with respect to the said operating mechanism.

I claim:—

In a device of the character specified, a fixed support comprising a rod having means for engaging an over-head wall to support the rod in vertical position, a track rail, a connection between the track rail and the rod for permitting the rail to rotate about the rod, and having means for moving the track rail vertically with respect to the rod and for holding it in adjusted position, a motor supporting carriage arranged below the track rail and having a wheel running upon the track rail, and a pivotal connection between the carriage and the wheel for permitting the carriage to rotate on a vertical axis with respect to the wheel, the track rail having stops at the end remote from the rod and intermediate its ends for limiting the movement of the wheel in each direction.

PATRICK KILLPATRICK.

Witnesses:
CLARENCE E. CANDY,
WILLIAM C. THENDALL.

Copies of this patent may be obtained for five cents each, by addressing the "Commissioner of Patents, Washington, D. C."